(12) United States Patent
Tang et al.

(10) Patent No.: US 12,552,021 B2
(45) Date of Patent: Feb. 17, 2026

(54) TECHNIQUES FOR TRAINING AND IMPLEMENTING REINFORCEMENT LEARNING POLICIES FOR ROBOT CONTROL

(71) Applicant: NVIDIA CORPORATION, Santa Clara, CA (US)

(72) Inventors: Bingjie Tang, Los Angeles, CA (US); Yashraj Shyam Narang, Seattle, WA (US); Dieter Fox, Seattle, WA (US); Fabio Tozeto Ramos, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 113 days.

(21) Appl. No.: 18/489,789

(22) Filed: Oct. 18, 2023

(65) Prior Publication Data
US 2024/0300099 A1 Sep. 12, 2024

Related U.S. Application Data

(60) Provisional application No. 63/488,667, filed on Mar. 6, 2023.

(51) Int. Cl.
*B25J 9/16* (2006.01)

(52) U.S. Cl.
CPC .............. *B25J 9/163* (2013.01); *B25J 9/1605* (2013.01); *B25J 9/1653* (2013.01); *B25J 9/1664* (2013.01); *B25J 9/1671* (2013.01); *G05B 2219/40499* (2013.01)

(58) Field of Classification Search
CPC ........ B25J 9/163; B25J 9/1605; B25J 9/1653; B25J 9/1664; B25J 9/1671; G05B 2219/40499; G05B 2219/40032

USPC ................. 700/245–264; 318/568.11–568.25
See application file for complete search history.

(56) References Cited

U.S. PATENT DOCUMENTS

| | | | |
|---|---|---|---|
| 10,556,336 B1 * | 2/2020 | Bai | B25J 9/1671 |
| 10,800,040 B1 * | 10/2020 | Beckman | B25J 9/1605 |
| 11,213,946 B1 * | 1/2022 | Bai | G05D 1/0221 |
| 11,244,145 B2 * | 2/2022 | Eshima | G06V 40/171 |
| 11,461,589 B1 * | 10/2022 | Bai | G06N 3/08 |
| 11,494,632 B1 * | 11/2022 | Bai | G06N 3/09 |
| 11,584,008 B1 | 2/2023 | Beckman et al. | |
| 11,685,045 B1 | 6/2023 | Herzog et al. | |
| 11,707,838 B1 | 7/2023 | Vogelsong et al. | |

(Continued)

OTHER PUBLICATIONS

B. Lee, C. Zhang, Z. Huang and D. D. Lee, "Online Continuous Mapping using Gaussian Process Implicit Surfaces," 2019, IEEE, International Conference on Robotics and Automation (ICRA), Montreal, QC, Canada, 2019, pp. 6884-6890, doi: 10.1109/ICRA.2019.8794324. (Year: 2019).*

(Continued)

*Primary Examiner* — Jaime Figueroa
(74) *Attorney, Agent, or Firm* — Artegis Law Group, LLP

(57) ABSTRACT

One embodiment of a method for training a machine learning model to control a robot includes causing a model of the robot to move within a simulation based on one or more outputs of the machine learning model, computing an error within the simulation, computing at least one of a reward or an observation based on the error, and updating one or more parameters of the machine learning model based on the at least one of a reward or an observation.

22 Claims, 10 Drawing Sheets

(56) References Cited

U.S. PATENT DOCUMENTS

| | | | | |
|---|---|---|---|---|
| 11,735,309 | B2* | 8/2023 | Purdie | G16H 50/20 |
| | | | | 705/2 |
| 12,157,226 | B2* | 12/2024 | Kranski | B25J 9/161 |
| 12,168,296 | B1* | 12/2024 | Bennice | B25J 9/163 |
| 2004/0267404 | A1* | 12/2004 | Danko | E02F 3/438 |
| | | | | 700/245 |
| 2016/0364880 | A1* | 12/2016 | Barratt | G06T 7/149 |
| 2020/0159648 | A1* | 5/2020 | Ghare | G06F 8/65 |
| 2020/0265302 | A1* | 8/2020 | Sanyal | G06N 3/045 |
| 2021/0187733 | A1 | 6/2021 | Lee et al. | |
| 2021/0213973 | A1* | 7/2021 | Carillo Peña | G06N 3/063 |
| 2021/0358595 | A1* | 11/2021 | Tamersoy | G06T 17/00 |
| 2021/0390452 | A1* | 12/2021 | Kohata | G06N 5/04 |
| 2022/0105626 | A1* | 4/2022 | Luo | G05B 17/02 |
| 2022/0111517 | A1* | 4/2022 | Bennice | B25J 9/1605 |
| 2022/0172107 | A1* | 6/2022 | Butterfoss | B25J 9/1687 |
| 2022/0262100 | A1* | 8/2022 | Chandler | G06V 20/56 |
| 2022/0382246 | A1* | 12/2022 | Heiden | G06F 30/23 |
| 2023/0109398 | A1* | 4/2023 | Kranski | B25J 9/1615 |
| | | | | 700/250 |
| 2023/0226696 | A1 | 7/2023 | Mandlekar et al. | |
| 2023/0298263 | A1* | 9/2023 | Yang | G06T 7/50 |
| | | | | 382/100 |
| 2023/0410404 | A1* | 12/2023 | Barsan | G06T 15/005 |
| 2024/0253215 | A1 | 8/2024 | Bennice et al. | |
| 2024/0300096 | A1 | 9/2024 | Cherian et al. | |
| 2025/0128419 | A1 | 4/2025 | Lai et al. | |

OTHER PUBLICATIONS

Oliff et al; Reinforcement learning for facilitating human-robot-interaction in manufacturing; 2020; Elsevier; Journal of Manufacturing Systems, 56(2020) 326-340; https://doi.org/10.1016/j.jmsy.2020.06.018; (Year: 2020).*
Abeyruwan et al., "i-Sim2Real: Reinforcement Learning of Robotic Policies in Tight Human-Robot Interaction Loops", 6th Conference on Robot Learning, arXiv:2207.06572, Nov. 22, 2022, pp. 1-32.
Akkaya et al., "Solving Rubik's Cube with a Robot Hand", arXiv:1910.07113, Oct. 16, 2019, pp. 1-51.
Allshire et al., "Transferring Dexterous Manipulation from GPU Simulation to a Remote Real-World TriFinger", arXiv:2108.09779, Oct. 20, 2022, 8 pages.
Andrews et al., "Contact and Friction Simulation for Computer Graphics", SIGGRAPH Courses, https://doi.org/10.1145/3532720.3535640, Aug. 7-11, 2022, pp. 1-172.
Andrychowicz et al., "Learning Dexterous In-Hand Manipulation", The International Journal of Robotics Research, DOI: 10.1177/0278364919887447, vol. 39, 2020, pp. 3-20.
Apolinarska et al., "Robotic Assembly of Timber Joints Using Reinforcement Learning", Automation in Construction, https://doi.org/10.1016/j.autcon.2021.103569, vol. 125, No. 103569, Feb. 27, 2021, pp. 1-8.
Beltran-Hernandez et al., "Variable Compliance Control for Robotic Peg-in-Hole Assembly: A Deep-Reinforcement-Learning Approach", Applied Sciences, doi:10.3390/app10196923, vol. 10, No. 6923, Oct. 2, 2020, pp. 1-17.
Bengio et al., "Curriculum Learning", Proceedings of the 26th International Conference on Machine Learning, 2009, pp. 41-48.
Chen et al., "Visual Dexterity: In-hand Dexterous Manipulation from Depth", arXiv:2211.11744, Nov. 21, 2022, pp. 1-61.
Chen et al., "Midas: A Multi-Joint Robotics Simulator with Intersection-Free Frictional Contact", arXiv:2210.00130, Sep. 30, 2022, 6 pages.
Davchev et al., "Residual Learning from Demonstration: Adapting DMPs for Contact-rich Manipulation", arXiv:2008.07682, Sep. 14, 2021, 8 pages.
Drake, Samuel Hunt, "Using Compliance in Lieu of Sensory Feedback for Automatic Assembly", 1978, 173 pages.
Fan et al., "A Learning Framework for High Precision Industrial Assembly", International Conference on Robotics and Automation (ICRA), IEEE, May 20-24, 2019, pp. 811-817.

Ferguson et al., "Intersection-free Rigid Body Dynamics", ACM Transactions on Graphics, https://doi.org/10.1145/3450626.3459802, vol. 40, No. 4, Article 183, Aug. 2021, pp. 183:1-183:16.
Fu et al., "Safely Learning Visuo-Tactile Feedback Policies in Real for Industrial Insertion", arXiv:2210.01340, Oct. 4, 2022, 7 pages.
Gaz et al., "Dynamic Identification of the Franka Emika Panda Robot With Retrieval of Feasible Parameters Using Penalty-Based Optimization", IEEE Robotics and Automation Letters, DOI 10.1109/LRA.2019.2931248, vol. 4, No. 4, Oct. 2019, pp. 4147-4154.
Handa et al., "DeXtreme: Transfer of Agile In-hand Manipulation from Simulation to Reality", arXiv:2210.13702, Oct. 25, 2022, pp. 1-28.
He et al., "Mask R-CNN", IEEE International Conference on Computer Vision (ICCV), 2017, pp. 2961-2969.
Hebecker et al., "Towards Real-World Force-Sensitive Robotic Assembly through Deep Reinforcement Learning in Simulations", IEEE/ASME International Conference on Advanced Intelligent Mechatronics, 2021, pp. 1045-1051.
Hou et al., "Data-efficient Hierarchical Reinforcement Learning for Robotic Assembly Control Applications", IEEE Transactions on Industrial Electronics, DOI 10.1109/TIE.2020.3038072, 2020, 11 pages.
Huang et al., "Fast Peg-and-Hole Alignment Using Visual Compliance", International Conference on Intelligent Robots and Systems (IROS), Nov. 3-7, 2013, pp. 286-292.
Inoue et al., "Deep Reinforcement Learning for High Precision Assembly Tasks", International Conference on Intelligent Robots and Systems (IROS), Sep. 24-28, 2017, pp. 819-825.
Johannink et al., "Residual Reinforcement Learning for Robot Control", International Conference on Robotics and Automation (ICRA), May 20-24, 2019, pp. 6023-6029.
Kimble et al., "Benchmarking Protocols for Evaluating Small Parts Robotic Assembly Systems", IEEE Robotics and Automation Letters, vol. 5, No. 2, Apr. 2020, pp. 883-889.
Kimble et al., "Performance Measures to Benchmark the Grasping, Manipulation, and Assembly of Deformable Objects Typical to Manufacturing Applications", Frontiers in Robotics and AI, DOI 10.3389/frobt.2022.999348, Nov. 21, 2022, pp. 1-12.
Lambeta et al., "DIGIT: A Novel Design for a Low-Cost Compact High-Resolution Tactile Sensor With Application to In-Hand Manipulation", IEEE Robotics and Automation Letters, vol. 5, No. 3, Jul. 2020, pp. 3838-3845.
Lan et al., "Affine Body Dynamics: Fast, Stable and Intersection-free Simulation of Stiff Materials", arXiv:2201.10022, Jan. 31, 2022, pp. 1-14.
Lee et al., "Learning Quadrupedal Locomotion Over Challenging Terrain", Science Robotics, DOI: 10.1126/scirobotics.abc5986, vol. 5, Oct. 21, 2020, pp. 1-13.
Lee et al., "Guided Uncertainty-Aware Policy Optimization: Combining Learning and Model-Based Strategies for Sample-Efficient Policy Learning", IEEE International Conference on Robotics and Automation (ICRA), May 31-Aug. 31, 2020, pp. 7505-7512.
Lin et al., "Microsoft COCO: Common Objects in Context", arXiv:1405.0312, May 1, 2014, pp. 1-14.
Lozano-Perez et al., "Automatic Synthesis of Fine-Motion Strategies for Robots", The International Journal of Robotics Research, vol. 3, No. 1, 1984, pp. 3-24.
Luo et al., "Reinforcement Learning on Variable Impedance Controller for High-Precision Robotic Assembly", International Conference on Robotics and Automation (ICRA), May 20-24, 2019, pp. 3080-3087.
Luo et al., "Robust Multi-Modal Policies for Industrial Assembly via Reinforcement Learning and Demonstrations: A Large-Scale Study", arXiv:2103.11512, Jul. 31, 2021, 10 pages.
Luo et al., "Dynamic Experience Replay", 3rd Conference on Robot Learning, 2019, pp. 1-10.
Luo et al., "A Learning Approach to Robot-Agnostic Force-Guided High Precision Assembly", arXiv:2010.08052, Aug. 2, 2021, 7 pages.
Macklin, Miles, "Nvidia Warp: A High-performance Python Framework for GPU Simulation and Graphics", Retrieved from https://github.com/nvidia/warp, Mar. 2022, 9 pages.

(56) References Cited

OTHER PUBLICATIONS

Macklin et al., "Local Optimization for Robust Signed Distance Field Collision", Proceedings of the ACM on Computer Graphics and Interactive Techniques, https://doi.org/10.1145/3384538, vol. 3, No. 1, Article 8, May 2020, pp. 8:1-8:17.
Makoviichuk et al., "RL Games: A High performance RL Library", RL Implementations, https://github.com/Denys88/rl_games, May 2022, 18 pages.
Makoviychuk et al., "Isaac Gym: High Performance GPU-Based Physics Simulation for Robot Learning", arXiv:2108.10470, Aug. 25, 2021, pp. 1-32.
Margolis et al., "Rapid Locomotion via Reinforcement Learning", arXiv:2205.02824, May 5, 2022, 12 pages.
Morgan et al., "Vision-driven Compliant Manipulation for Reliable, High-Precision Assembly Tasks" arXiv:2106.14070, Jun. 26, 2021, 13 pages.
Muratore et al., "Assessing Transferability from Simulation to Reality for Reinforcement Learning", IEEE Transactions on Pattern Analysis and Machine Intelligence, DOI 10.1109/TPAMI.2019.2952353, Oct. 2, 2019, pp. 1-12.
Narang et al., "Factory: Fast Contact for Robotic Assembly", arXiv:2205.03532, May 7, 2022, 21 pages.
Peng et al., "Sim-to-Real Transfer of Robotic Control with Dynamics Randomization", IEEE International Conference on Robotics and Automation (ICRA), May 21-25, 2018, pp. 3803-3810.
Pinto et al., "Asymmetric Actor Critic for Image-Based Robot Learning", arXiv:1710.06542, Oct. 18, 2017, 8 pages.
Rudin et al., "Learning to Walk in Minutes Using Massively Parallel Deep Reinforcement Learning", 5th Conference on Robot Learning, 2021, pp. 1-10.
Schoettler et al., "Meta-Reinforcement Learning for Robotic Industrial Insertion Tasks", IEEE/RSJ International Conference on Intelligent Robots and Systems (IROS), DOI: 10.1109/IROS45743.2020.9340848, Oct. 25-29, 2020, pp. 9728-9735.
Schulman et al., "Proximal Policy Optimization Algorithms", arXiv:1707.06347, Aug. 28, 2017, pp. 1-12.
Shao et al., "Learning to Scaffold the Development of Robotic Manipulation Skills", IEEE International Conference on Robotics and Automation (ICRA), May 31-Aug. 31, 2020, pp. 5671-5677.
Si et al., "Taxim: An Example-based Simulation Model for GelSight Tactile Sensors", arXiv:2109.04027, Dec. 14, 2021, 8 pages.
Son et al., "Sim-to-Real Transfer of Bolting Tasks with Tight Tolerance", IEEE/RSJ International Conference on Intelligent Robots and Systems (IROS), DOI: 10.1109/IROS45743.2020.9341644, Oct. 25-29, 2020, pp. 9056-9063.
Spector et al., "InsertionNet—A Scalable Solution for Insertion", IEEE Robotics and Automation Letters, 2021, pp. 2-9.
Spector et al., "Deep Reinforcement Learning for Contact-Rich Skills Using Compliant Movement Primitives", arXiv:2008.13223, Oct. 25, 2020, pp. 1-27.
Spector et al., "InsertionNet 2.0: Minimal Contact Multi-Step Insertion Using Multimodal Multiview Sensory Input", arXiv:2203.01153, Mar. 2, 2022, 7 pages.
Tang et al., "Autonomous Alignment of Peg and Hole by Force/Torque Measurement for Robotic Assembly", IEEE International Conference on Automation Science and Engineering (CASE), Aug. 21-24, 2016, pp. 162-167.
Thomas et al., "Learning Robotic Assembly from CAD", IEEE International Conference on Robotics and Automation (ICRA), May 21-25, 2018, pp. 3524-3531.
Tian et al., "Assemble Them All: Physics-Based Planning for Generalizable Assembly by Disassembly", ACM Transactions on Graphics, https://doi.org/10.1145/3550454.3555525, vol. 41, No. 6, Article 278, Dec. 2022, pp. 278:1-278:15.
Tsai et al., "A New Technique for Fully Autonomous and Efficient 3D Robotics Hand/Eye Calibration", IEEE Transactions on Robotics and Automation, vol. 5, No. 3, Jun. 1989, pp. 345-358.
Vecerik et al., "Leveraging Demonstrations for Deep Reinforcement Learning on Robotics Problems with Sparse Rewards", arXiv:1707.08817, Oct. 8, 2018, pp. 1-10.
Vecerik et al., "A Practical Approach to Insertion with Variable Socket Position Using Deep Reinforcement Learning", International Conference on Robotics and Automation (ICRA), May 20-24, 2019, pp. 754-760.
Drigalski et al., "Robots Assembling Machines: Learning from the World Robot Summit 2018 Assembly Challenge", Advanced Robotics, arXiv:1911.05884, vol. 1, No. 1, Jan. 2020, pp. 1-18.
Vuong et al., "Learning Sequences of Manipulation Primitives for Robotic Assembly", arXiv:2011.00778, Mar. 26, 2021, 7 pages.
Wang et al., "TACTO: A Fast, Flexible, and Open-source Simulator for High-Resolution Vision-based Tactile Sensors", IEEE Robotics and Automation Letters, DOI: 10.1109/LRA.2022.3146945, Feb. 10, 2022, pp. 1-8.
Wen et al., "You Only Demonstrate Once: Category-Level Manipulation from Single Visual Demonstration", arXiv:2201.12716, May 6, 2022, 22 pages.
Whitney, D. E., "Quasi-Static Assembly of Compliantly Supported Rigid Parts", Journal of Dynamic Systems, Measurement, and Control, vol. 104, Mar. 1982, pp. 65-77.
Wu et al., "Learning Dense Rewards for Contact-Rich Manipulation Tasks", arXiv:2011.08458, Nov. 17, 2020, 8 pages.
Xia et al., "Dynamic Analysis for Peg-In-Hole Assembly With Contact Deformation", The International Journal of Advanced Manufacturing Technology, vol. 30, DOI 10.1007/s00170-005-0047-4, 2006, pp. 118-128.
Xu et al., "Efficient Tactile Simulation with Differentiability for Robotic Manipulation", 6th Conference on Robot Learning, 2022, pp. 1-11.
Xu et al., "Compare Contact Model-based Control and Contact Model-free Learning: A Survey of Robotic Peg-in-hole Assembly Strategies", IEEE, arXiv:1904.05240, Mar. 2019, pp. 1-15.
Yoon et al., "Fast and Accurate Data-Driven Simulation Framework for Contact-Intensive Tight-Tolerance Robotic Assembly Tasks", arXiv:2202.13098, Feb. 26, 2022, pp. 1-16.
Yuan et al., "GelSight: High-Resolution Robot Tactile Sensors for Estimating Geometry and Force", Sensors, vol. 17, No. 2762, doi:10.3390/s17122762, Nov. 29, 2017, pp. 1-21.
Zhang et al., "A Modular Robotic Arm Control Stack for Research: Franka-Interface and FrankaPy" arXiv:2011.02398, Nov. 4, 2020, pp. 1-7.
Zhang et al., "Learning Insertion Primitives with Discrete-Continuous Hybrid Action Space for Robotic Assembly Tasks", arXiv:2110.12618, Oct. 25, 2021, 7 pages.
Zhao et al., "Offline Meta-Reinforcement Learning for Industrial Insertion", arXiv:2110.04276, Sep. 1, 2022, 8 pages.
Lee et al., "Making sense of vision and touch: Learning multimodal representations for contact-rich tasks", arXiv:2305.17110v1, Jul. 28, 2019, 14 pages.
Non Final Office Action received for U.S. Appl. No. 18/490,630, dated May 22, 2025, 24 pages.
Final Office Action received for U.S. Appl. No. 18/490,630, dated Aug. 27, 2025, 18 pages.
Notice of Allowance received for U.S. Appl. No. 18/490,630, dated Nov. 21, 2025, 7 pages.

* cited by examiner

TECHNIQUES FOR TRAINING AND IMPLEMENTING REINFORCEMENT LEARNING POLICIES FOR ROBOT CONTROL

CROSS-REFERENCE TO RELATED APPLICATIONS

This application claims priority benefit of the United States Provisional Patent Application titled, "TECHNIQUES FOR TRAINING AND IMPLEMENTING REINFORCEMENT LEARNING POLICIES FOR SIMULATED ROBOTS," filed on Mar. 6, 2023, and having Ser. No. 63/488,667. The subject matter of this related application is hereby incorporated herein by reference.

BACKGROUND

Technical Field

Embodiments of the present disclosure relate generally to computer science, artificial intelligence, and robotics and, more specifically, to techniques for training and implementing reinforcement learning policies for robot control.

Description of the Related Art

Robots are being increasingly used to perform tasks automatically or autonomously in various environments. For example, in a factory setting, robots are oftentimes used to assemble objects together. One approach for controlling robots is to first train a machine learning model with respect to a given task and then use the trained machine learning model to perform the given task in a particular environment.

Some conventional techniques for training a machine learning machine to control a robot use training data that is generated using a physical robot that performs a task in a real-world environment. These types of approaches are sometimes referred to as "real-world" training. One drawback of real-world training is that this type of training can cause damage, including wear and tear, to the robot that performs the task in the real-world environment and to objects with which the robot interacts during the data generating process.

In order to avoid the damage to the robot and to other objects that is caused by real-world training, a machine learning model can instead be trained using training data that is generated via a simulation of the robot performing the task in a virtual environment. "Curriculum learning" is one approach for training a machine learning model using this type of generated training data. During curriculum learning, the problem of controlling the robot to perform a given task is presented to a machine learning model at increasing degrees of difficulty. The machine learning model, in turn, is trained at each of those degrees of difficulty. For example, for the task of inserting a plug into a socket, curriculum learning can begin by training the machine learning model to control a robot to insert a plug that is already halfway inside the socket the rest of the way into the socket. After the machine learning model has learned to insert a plug that is already halfway inside the socket, the machine learning model can then be trained to control the robot to insert the plug into the socket starting from increasing distances away from the socket.

Sometimes, during curriculum learning, a reward is computed to signify the desirability of control actions output by the machine learning model. The reward is used to update parameters of the machine learning model so that the machine learning model is more likely to generate desirable actions through the training. For example, the reward could be computed based on distances between points on one object, such as a plug, and corresponding points on another object, such as a socket. In such a case, smaller distances between the points on the object and the corresponding points on the other object could be associated with larger rewards if smaller distances are more desirable than larger distances.

One drawback of using training data that is generated via robot simulations to train a machine learning model, including through curriculum learning, is that simulators can produce errors, such as interpenetrations between the robot and objects with which the robot interacts during the simulations. These errors can be caused by limitations on the accuracy of the simulations, such as the number of decimal places used to represent numbers in a given simulation. Because the errors produced using simulations, such as interpenetrations between the robot and objects with which the robot interacts, are not physically possible in the real world, a machine learning model that is trained using training data that includes these errors can be improperly trained. When the improperly trained machine learning is deployed to control a physical robot in a real-world environment, that machine learning model may fail to correctly control the physical robot to perform a task.

One drawback of using curriculum learning to train a machine learning model to control a robot is that, during the curriculum learning, the machine learning model can initially learn to control the robot to perform an easy version of a task, but the machine learning model may be unable to further learn to control the robot to perform a more difficult version of that task. Returning to the example of inserting a plug into a socket, a machine learning model could first be trained to control a robot to insert a plug that is already halfway inside of a socket the rest of the way into the socket. Then, the machine learning model could be trained to control the robot to insert a plug into the socket starting from increasing distances away from the socket, which is more difficult than inserting a plug that is already halfway inside the socket. However, because the behavior of inserting a plug that is outside the socket is significantly different from the behavior of inserting a plug that is already halfway inside the socket, the machine learning model may be unable to learn the behavior of inserting the plug that is outside the socket after first learning the behavior of inserting the plug that is halfway inside the socket.

One drawback of the conventional rewards that are used to train machine learning models to control robots, including during curriculum learning, is that those rewards can be over or under specific. When an over-specific or under-specific reward is used to train a machine learning model, the trained machine learning model can also be unable to correctly perform a desired task. An example of an over-specific reward is a reward that is computed based on distances between a number of points on a plug and corresponding points inside a socket into which the plug is to be inserted. When the plug and the socket are symmetric (e.g., cylindrical in shape), the plug can be inserted into the socket in many different orientations, rather than the single orientation required by the over-specific reward. However, a machine learning model that is trained using the over-specific reward would not be able to insert the plug into the socket in the different orientations. An example of an under-specific reward is a reward that is computed based on distances between points at the center of a plug and points at the center of a socket into which the plug is to be inserted. When the plug and the socket have specific shapes that need to be aligned in order for the plug to be inserted into the socket, a machine learning model that is trained using the under-specific reward may not be able to correctly align the shape of the plug with the shape of the socket in order to insert the plug into the socket.

As the foregoing illustrates, what is needed in the art are more effective techniques for controlling robots to perform tasks.

SUMMARY

One embodiment of the present disclosure sets forth a computer-implemented method for training a machine learning model to control a robot. The method includes causing a model of the robot to move within a simulation based on one or more outputs of the machine learning model. The method further includes computing an error within the simulation. The method also includes computing at least one of a reward or an observation based on the error. In addition, the method includes updating one or more parameters of the machine learning model based on the at least one of a reward or an observation.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques account for errors, such as interpenetrations between a robot and one or more objects, that are produced by a simulator when a machine learning model is trained to perform a task using training data that is generated by simulating the robot performing the task. After being trained according to the disclosed techniques, the machine learning model can correctly control a physical robot to perform the task in a real-world environment. Further, the disclosed techniques enable a machine learning model to be trained using sampling-based curriculum training and a signed distance field (SDF)-based reward, which can allow the machine learning model to more successfully learn how to control a robot relative to what can be achieved using prior art training approaches. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for training a machine learning model to control a robot. In some embodiments, a model trainer trains the machine learning model using a sampling-based curriculum. In the sampling-based curriculum, the model trainer first trains the machine learning model to perform a robotic task within an entire range of difficulties of the task. When the success rate of the machine learning model in controlling the robot to perform the task exceeds a threshold success rate, the model trainer increases a lower bound of the range of difficulties of the task that the machine learning model is trained with, and so forth. In some embodiments, the model trainer also computes an error during one or more physical simulations that are used to generate training data for training the machine learning model. Then, the model trainer computes a reward that penalizes the error and/or an observation based on the error, updates parameters of the machine learning model during training based on the error. In addition, in some embodiments, the reward can also be computed based on a distance between an object that the robot grasps during a simulation and a signed distance field (SDF) associated with a target pose that the object should achieve. Once trained, the machine learning model can be deployed to control a physical robot to perform the task in a real-world environment.

The techniques for training and using machine learning model(s) to control robots to perform tasks have many real-world applications. For example, those techniques could be used to control a robot to grasp and manipulate an object, such as picking up the object, placing the object, and/or inserting the object into another object. As a further example, those techniques could be used to control a robot to assemble objects together.

The above examples are not in any way intended to be limiting. As persons skilled in the art will appreciate, as a general matter, the techniques for controlling robots described herein can be implemented in any suitable application.

System Overview

Figure 1:
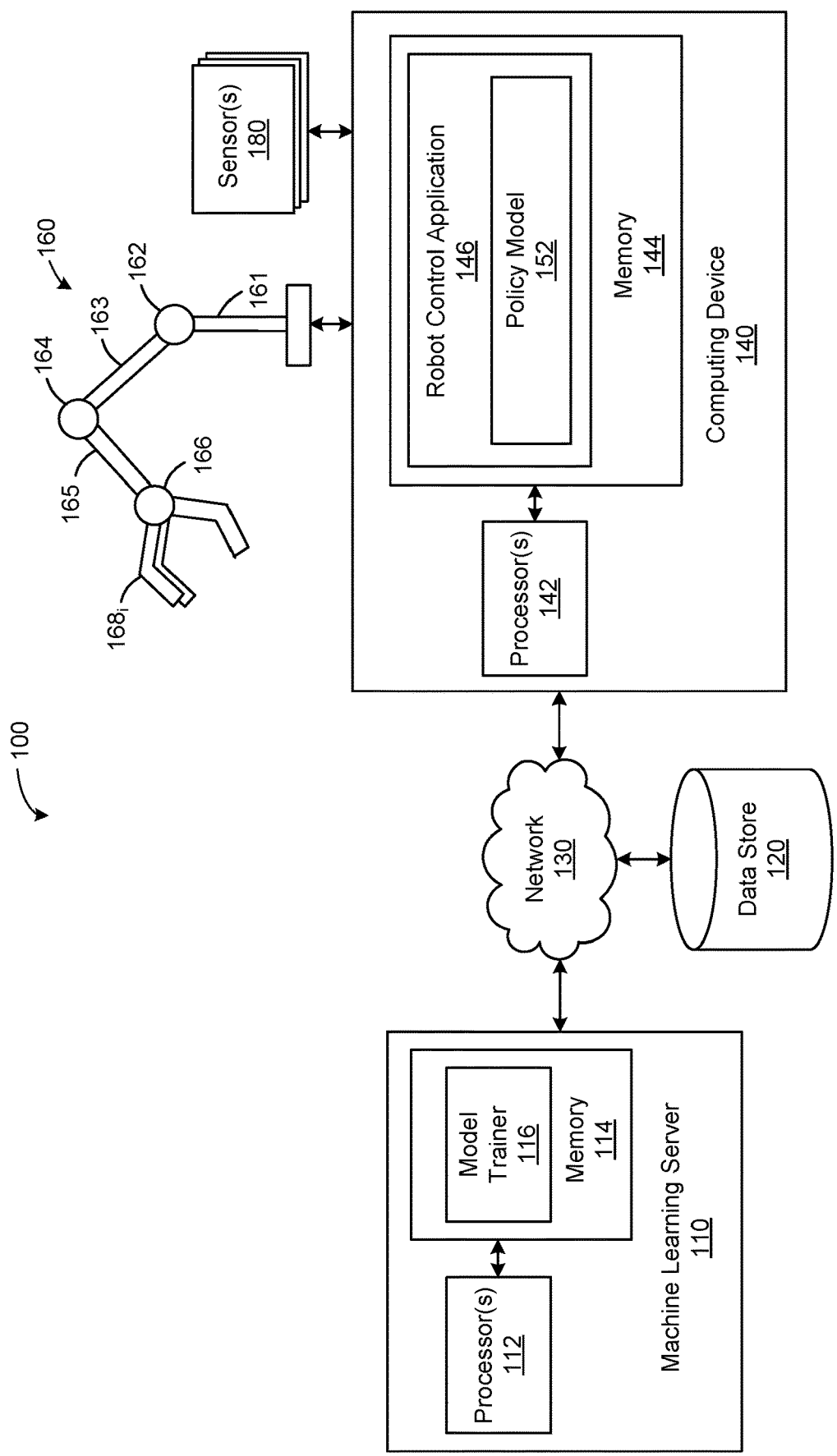
FIG. 1 illustrates a block diagram of a computer-based system configured to implement one or more aspects of the various embodiments.

FIG. 1 illustrates a block diagram of a computer-based system 100 configured to implement one or more aspects of at least one embodiment. As shown, the system 100 includes a machine learning server 110, a data store 120, and a computing device 140 in communication over a network 130, which can be a wide area network (WAN) such as the Internet, a local area network (LAN), a cellular network, and/or any other suitable network.

As shown, a model trainer 116 executes on one or more processors 112 of the machine learning server 110 and is stored in a system memory 114 of the machine learning server 110. The processor 112 receives user input from input devices, such as a keyboard or a mouse. In operation, the one or more processors 112 may include one or more primary processors of the machine learning server 110, controlling and coordinating operations of other system components. In particular, the processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

The system memory 114 of the machine learning server 110 stores content, such as software applications and data, for use by the processor(s) 112 and the GPU(s) and/or other processing units. The system memory 114 can be any type of memory capable of storing data and software applications, such as a random-access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, and/or any suitable combination of the foregoing.

The machine learning server 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1 can be modified as desired. In some embodiments, any combination of the processor(s) 112, the system memory 114, and/or GPU(s) can be included in and/or replaced with any type of virtual computing system, distributed computing system, and/or cloud computing environment, such as a public, private, or a hybrid cloud system.

In some embodiments, the model trainer 116 is configured to train one or more machine learning models, including a policy model 152 that is trained to control a robot to perform a task. Techniques that the model trainer 116 can employ to train the machine learning model(s) are discussed in greater detail below in conjunction with FIGS. 3-10. Training data and/or trained (or deployed) machine learning models, including the policy model 152, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in at least one embodiment the machine learning server 110 can include the data store 120.

As shown, a robot control application 146 that uses the policy model 152 is stored in a system memory 144, and executes on a processor 142, of the computing device 140. Once trained, the policy model 152 can be deployed, such as via robot control application 146. Illustratively, given sensor data captured by one or more sensors 180 (e.g., cameras), the policy model 152 can be used to control a robot 160 to perform the task for which the policy model 152 was trained.

As shown, the robot 160 includes multiple links 161, 163, and 165 that are rigid members, as well as joints 162, 164, and 166 that are movable components that can be actuated to cause relative motion between adjacent links. In addition, the robot 160 includes multiple fingers $168_i$ (referred to herein collectively as fingers 168 and individually as a finger 168) that can be controlled to grip an object. For example, in some embodiments, the robot 160 may include a locked wrist and multiple (e.g., four) fingers. Although an example robot 160 is shown for illustrative purposes, in some embodiments, techniques disclosed herein can be applied to control any suitable robot.

Figure 2:
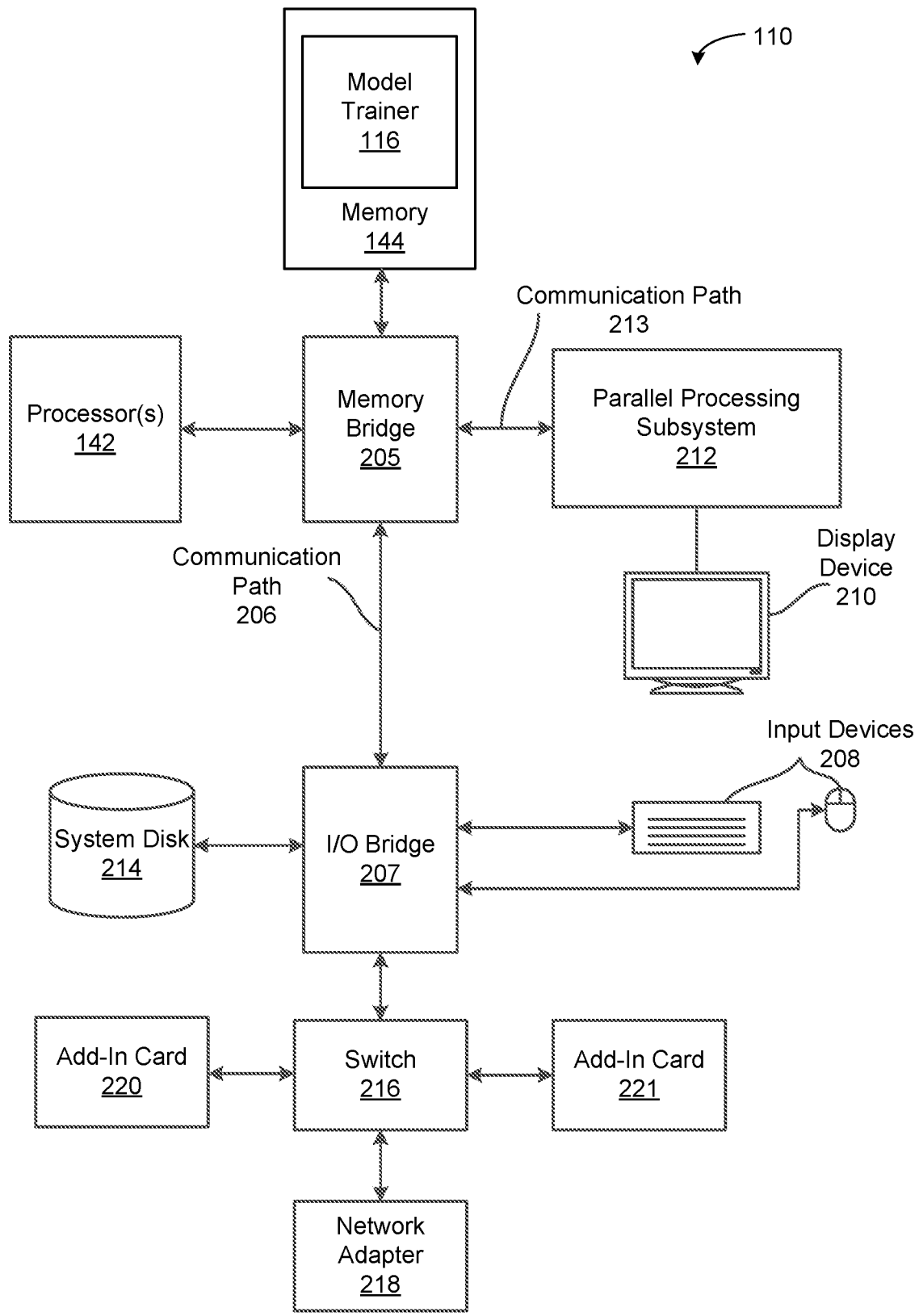
FIG. 2 is a more detailed illustration of the machine learning server of FIG. 1, according to various embodiments.

FIG. 2 is a block diagram illustrating the machine learning server 110 of FIG. 1 in greater detail, according to various embodiments. Machine learning server 110 may include any type of computing system, including, without limitation, a server machine, a server platform, a desktop machine, a laptop machine, a hand-held/mobile device, a digital kiosk, an in-vehicle infotainment system, and/or a wearable device. In some embodiments, machine learning server 110 is a server machine operating in a data center or a cloud computing environment that provides scalable computing resources as a service over a network. In some embodiments, the computing device 140 can include one or more similar components as the machine learning server 110.

In various embodiments, the machine learning server 110 includes, without limitation, the processor(s) 142 and the memory(ies) 144 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard, mouse, touch screen, sensor data analysis (e.g., evaluating gestures, speech, or other information about one or more uses in a field of view or sensory field of one or more sensors), and/or the like, and forward the input information to the processor(s) 142 for processing. In some embodiments, the machine learning server 110 may be a server machine in a cloud computing environment. In such embodiments, machine learning server 110 may not include input devices 208, but may receive equivalent input information by receiving commands (e.g., responsive to one or more inputs from a remote computing device) in the form of messages transmitted over a network and received via the network adapter 218. In some embodiments, switch 216 is configured to provide connections between I/O bridge 207 and other components of the machine learning server 110, such as a network adapter 218 and various add-in cards 220 and 221.

In some embodiments, I/O bridge 207 is coupled to a system disk 214 that may be configured to store content and applications and data for use by processor(s) 142 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within machine learning server 110, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. Such circuitry may be incorporated across one or more parallel processing units (PPUs), also referred to herein as parallel processors, included within the parallel processing subsystem 212.

In some embodiments, the parallel processing subsystem 212 incorporates circuitry optimized (e.g., that undergoes optimization) for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and/or compute processing operations. System memory 144 includes at least one device driver configured to manage the processing operations of the one or more PPUs within parallel processing subsystem 212. In addition, the system memory 144 includes the model trainer 116. Although described herein primarily with respect to the model trainer 116, techniques disclosed herein can also be implemented, either entirely or in part, in other software and/or hardware, such as in the parallel processing subsystem 212.

In various embodiments, parallel processing subsystem 212 may be integrated with one or more of the other elements of FIG. 2 to form a single system. For example, parallel processing subsystem 212 may be integrated with processor 142 and other connection circuitry on a single chip to form a system on a chip (SoC).

In some embodiments, processor(s) 142 includes the primary processor of machine learning server 110, controlling and coordinating operations of other system components. In some embodiments, the processor(s) 142 issues commands that control the operation of PPUs. In some embodiments, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 144 could be connected to the processor(s) 142 directly rather than through memory bridge 205, and other devices may communicate with system memory 144 via memory bridge 205 and processor 142. In other embodiments, parallel processing subsystem 212 may be connected to I/O bridge 207 or directly to processor 142, rather than to memory bridge 205. In still other embodiments, I/O bridge 207 and memory bridge 205 may be integrated into a single chip instead of existing as one or more discrete devices. In certain embodiments, one or more components shown in FIG. 2 may not be present. For example, switch 216 could be eliminated, and network adapter 218 and add-in cards 220, 221 would connect directly to I/O bridge 207. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in at least one embodiment. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Training and Implementing Reinforcement Learning Policies for Robot Control

Figure 3:
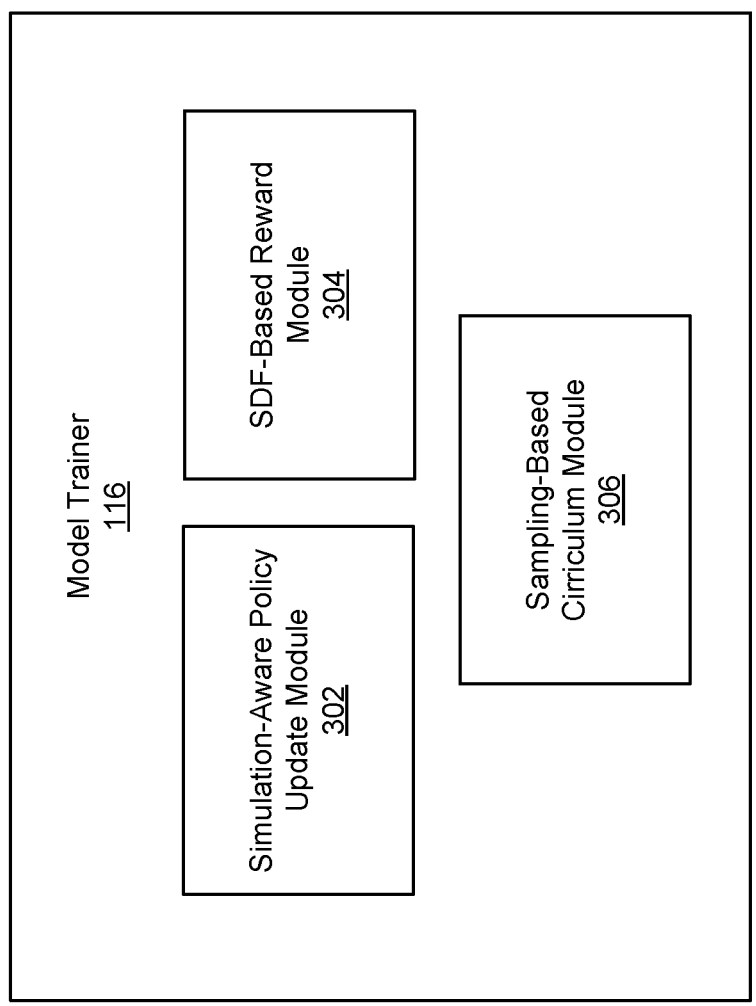
FIG. 3 is a more detailed illustration of the model trainer of FIG. 1, according to various embodiments.

FIG. 3 is a more detailed illustration of the model trainer 116 of FIG. 1, according to various embodiments. As shown, the model trainer 116 includes a simulation-aware policy update module 302, a signed distance function (SDF)-based reward module 304, and a sampling-based curriculum module 306. The sampling-based curriculum module 306 trains a machine learning model (e.g., the policy model 152) to control a robot using reinforcement learning and a sampling-based curriculum. During sampling-based curriculum learning, the sampling-based curriculum module 306 first trains the machine learning model to perform a robotic task within an entire range of difficulties. In some embodiments, the machine learning model is trained during an episode in which multiple simulations of the machine learning model being used to control a robot to perform the task at various levels of difficulty, which are uniformly sampled from the range of difficulties, are executed in parallel. Then, the sampling-based curriculum module 306 iteratively increases a lower bound of the range of difficulties when a success rate of the machine learning model in performing the task during the episode exceeds a threshold success rate. In some embodiments, the difficulty can be based on an initial distance of an object to a goal. Returning to the example of inserting a plug into a socket, a more difficult task can include inserting the plug beginning from a position that is farther away from the socket, including being outside of the socket and/or perturbed along the x and y axes such that the plug cannot be inserted directly into the socket. When the success rate of the machine learning model in performing the task in a current range of difficulties exceeds the threshold success rate, the sampling-based curriculum module 306 increases a lower bound of the range of difficulties that the machine learning model is trained with. Returning to the example of inserting a plug into a socket, increasing the lower bound of the range of difficulties can include increasing the minimum initial distance between the plug and the socket. When the minimum initial distance is increased, the machine learning model is trained using simulations in which the plug begins from randomly sampled initial distances that are at least the minimum initial distance from the socket. Accordingly, the machine learning model is trained using more simulations of the plug that are further away from the socket as the success rate of the machine learning model at performing the task improves. It should be noted that exposing the machine learning model to the entire range of difficulties from the beginning, and then increasing the lower bound of the range of difficulties, prevents overfitting during training, in which the machine learning model learns to perform the easiest version of a task but then cannot learn to perform more difficult versions of the task.

The simulation-aware policy update module 302 accounts for errors during the simulations that are used to generate training data for training a machine learning model (e.g., policy model 152) to control a robot. The errors can include any suitable deviations of the simulations from reality. For example, in some embodiments, the errors can include a solver residual indicating the error when solving the underlying physical equations at each time step of a simulation, deviation from a ground truth, deviation from a slower version of the simulation, deviation from a reference value, deviation from an analytical solution, a combination thereof, etc. For example, in some embodiments, the error can be an interpenetration overlap between the computer-aided design (CAD) models of two objects (e.g., a plug and a socket) during a simulation, which can be computed by sampling points on meshes representing the two objects and checking if, in their current poses, any points on one mesh are inside the surface of the other mesh, indicating an interpenetration. In some embodiments, the simulation-aware policy update module 302 computes the error during a simulation and determines a reward that is used to train a machine learning model and penalizes the error. In such cases, the reward can be weighted according to the computed error such that a greater reward is provided when the error is less, and vice versa, as described in greater detail below in conjunction with FIG. 4. In some embodiments, the simulation-aware policy update module 302 inputs the error into the machine learning model as an observation during training of the machine learning model. In such cases, the reward and/or observation can be used to update parameters of the machine learning model during reinforcement learning, as described in greater detail below in conjunction with FIG. 7. By accounting for simulation error, the trained machine learning model can correctly control a physical robot to perform the task for which the machine learning model was trained in a real-world environment.

The SDF-based reward module 304 computes a reward used to train a machine learning model (e.g., policy model 152) based on a distance between an object that a robot grasps during a simulation and an SDF associated with a target pose that the object should achieve. Such a reward encourages surface alignment between the shape of geometry representing the object and the shape of the SDF. The SDF, itself, specifies the distances from points in space of the environment to the surfaces of one or more objects within the environment. From a given point in space, a positive distance indicates that the point is outside an object, and a negative distance indicates that the point is inside an object. In some embodiments, the SDF-based reward module 304 computes a distance between the object and the SDF as an average of distances between randomly sampled points on geometry representing the object and the SDF within the simulation. In such cases, the SDF can be computed at the beginning of each training episode, during which a number of simulations are executed in parallel, and a distance between the object and the SDF at any time step of a simulation can then be computed by (1) querying the distances from a number (e.g., 1000) of randomly sampled points on geometry representing the object to the SDF, and (2) averaging the queried distances. It should be understood that such a distance indicates how aligned the shape of geometry representing the object is with the shape of the SDF. In some embodiments, the distance between the object and the SDF that is computed can be an SDF query distance, which is the root-mean-square SDF distance. The SDF-based reward module 304 can further compute a reward based on the distance. The reward can then be used during reinforcement learning to update parameters of a machine learning model that is being trained to control a robot, as described in greater detail below in conjunction with FIG. 5. Unlike some conventional rewards used to train machine learning models to control robots, the reward based on the distance to the SDF is not over- or under-specific.

More formally, the robot control problem can be formulated as a Markov decision process (MDP) with state space $\mathcal{S}$, observation space $\mathcal{O}$, action space $\mathcal{A}$, state transition dynamics $\mathcal{T}: \mathcal{S} \times \mathcal{A} \to \mathcal{S}$, initial state distribution $\rho_0$, reward function $r: \mathcal{A} \to \mathbb{R}$, horizon length T, and discount factor $\gamma \in (0,1]$. Given such a formulation, the objective is to learn a policy (also referred to herein as the "actor" or the machine learning model that is trained to control the robot) $\pi: \mathcal{O} \to \mathbb{P}(\mathcal{A})$ that maximized the expected sum of discounted rewards $\mathbb{E}_\pi[\Sigma_{t=0}^{T-1} \gamma^t r(s_t)]$. In some embodiments, the proximal policy optimization (PPO) technique can be applied to learn a stochastic policy $a \sim \pi_\theta(o)$ (actor), mapping from observations $o \in \mathcal{O}$ to actions $a \in \mathcal{A}$ and parameterized by a network with weights $\theta$; as well as an approximation of the on-policy value function $v = V_\phi(s)$ (critic), mapping from states $s \in \mathcal{S}$ to value $v \in V$ and parameterized by weights $\phi$. Further, the policy can be trained in simulation and deployed in the real world with no policy adaptation phase on the specific real-world environment.

In some embodiments, the observation spaces in simulation and the real world are task-dependent. The observations provided to the policy include robot joint angles, gripper/object poses, and/or target poses. However, an asymmetric actor-critic technique can also be utilized, in which velocity information is still used to train the critic. In some embodiments, the action spaces for both simulation and the real world are task-independent. In such cases, the actions output by the policy can include incremental pose targets to a task-space impedance (TSI) controller (specifically, $a = [\Delta x; \Delta q]$, where $\Delta x$ is a position error and $\Delta q$ is a quaternion error). Further, incremental targets can be learned during training rather than absolute targets because the latter encodes task-specific biases and must be selected from a large spatial range. In some embodiments, the rewards in simulation can also be task-dependent. However, all rewards could be expressed in the following general form:

$$G = w_{h0}..w_{h_m} \left( \sum_{L=0}^{H-1} \left[ w_{d_0} R_{d_0}(t) + \cdots + w_{d_n} R_{d_n}(t) \right] + \right.$$
$$\left. w_{s_0} R_{s_0} + \cdots + w_{s_p} R_{s_p} \right)' \quad (1)$$

where G is the return over the horizon, $R_{d0} \ldots R_{dn}$ are distinct dense rewards, H is the horizon length, $R_{s_0} \ldots R_{s_p}$ are terminal success bonuses, $w_{d_0} \ldots w_{d_n}$ and $w_{s_0} \ldots w_{s_p}$ are scaling factors that map distinct reward into a consistent unit system and weight the importance of each term, and $w_{h_0} \ldots w_{h_m}$ are scaling factors on the return over the entire horizon. Not all terms in equation (1) need to be used in each phase of training.

As described, during sampling-based curriculum learning, the machine learning model that is being trained to control a robot is exposed to the entire range of initial state distributions from the start of the curriculum, but the lower bound of the range of difficulties is increased at each stage of the sampling-based curriculum learning. In some embodiments, at the start of each episode of training a 6 degree of freedom (DOF) end effector of a robot and object poses are initialized over a large spatial range. In addition, observation noise can be introduced in some embodiments. Such perturbations ensure robustness to initial conditions and sensor noise in the real world. Let $z^{low}$ denote the lower bound of the initial height of a plug above a socket at a given curriculum stage, and let $z^{high}$ denote a constant upper bound. The initial height of the plug can be uniformly sampled from Uniform $[z^{low}, z^{high}]$. In addition, let $\Delta z^i$ and $\Delta z^d$ denote an increase or decrease in $z^{low}$, and let $p_n$ denote the mean success rate over all environments during a simulation episode n. When episode n terminates, $z^{low}$ can be updated as follows:

$$z^{low} \leftarrow \begin{cases} z^{low} + \Delta z^i, & p_n > 80\% \\ z^{low} - \Delta z^d, & p_n < 10\% \\ z^{low}, & \text{otherwise.} \end{cases} \quad (2)$$

In some embodiments, the sampling-based curriculum module 306 can enforce $\Delta z^d < \Delta z^i$. In such cases, an increase in $z^{low}$ can be defined as an advance to the next stage of the curriculum, and a decrease in $z^{low}$ can be defined as a reversion to the previous stage.

Figure 4:
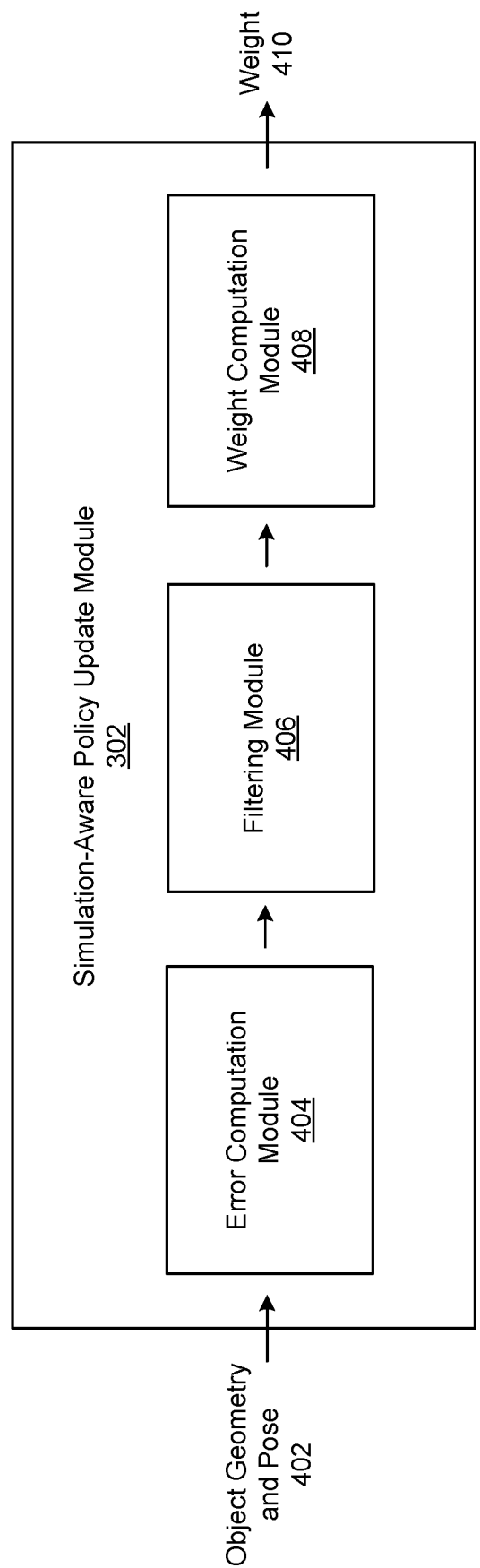
FIG. 4 is a more detailed illustration of the simulation-aware policy update module of FIG. 3, according to various embodiments.

FIG. 4 is a more detailed illustration of the simulation-aware policy update module 302 of FIG. 3, according to various embodiments. As shown, the simulation-aware policy update module 302 includes an error computation module 404, a filtering module 406, and a weight computation module 408. In operation, the error computation module 404 receives information about the geometry and poses 402 of objects during a simulation. Given such information, the error computation module 404 computes an error in the simulation. Any technically feasible error can be computed in some embodiments. For example, in some embodiments, the error can be an interpenetration between objects, such as a maximum interpenetration, which is not realistic. As a specific example, the simulation-aware policy update module 302 could take as input plug and socket meshes and associated 6-DOF poses, sample a number of points on/inside the mesh of the plug, transform the sampled points to the socket frame, compute distances to the socket mesh, and return as the error the maximum interpenetration depth, after which the depth can be used to weight a cumulative reward used to update parameters of the machine learning model. As further examples, in some embodiments, the error can include a solver residual, deviation from a ground truth, deviation from a slower version of the simulation, deviation from a reference value, deviation from an analytical solution, a combination thereof, etc. The filtering module 406 determines whether the error computed by the error computation module 404 is greater than an error threshold. If the error is greater than the error threshold, then the weight computation module 408 generates a weight 410 that is used to weight a reward and/or to generate an observation for updating the parameters of a machine learning model that is being trained to control a robot. For example, larger errors during simulation can result in a reward being weighted less, because the reward is unlikely to correspond to a physically possible state, and vice versa.

More formally, returning to the example of a plug being inserted into a socket, the filtering and weighting can be as follows. For a given episode, if $d_{ip}^{max} > \epsilon_{ip}$, where $d_{ip}^{max}$ is the maximum interpenetration depth between two objects (e.g., a plug and a socket) and $\epsilon_{ip}$ is a threshold, then do not use return to update the machine learning model. On the other hand, if $d_{ip}^{max} < \epsilon_{ip}$, weight return by $1 - \tanh(d_{ip}^{max} / \epsilon_d)$. In addition, the algorithm for checking interpenetration can be as follows:

---
Algorithm 1:

Input: plug mesh $m_p$, socket mesh $m_s$, plug pose $p_p$, socket pose $p_s$, number of query points N,
1   sample N points in $m_p \rightarrow v$, $v = \{v_0, \ldots, v_{N-1}\}$
2   transform v to current $m_p$ pose $p_p$ in $m_s$ frame;
3   for every vertex $v \in v$ do
4       compute closest point on $m_s$ to v;
5       if v inside $m_s$ then
6           calculate interpenetration distance;
7   $d_{ip}^{max}$ = max interpenetration from all $v \in v$ to $m_s$;
8   return $d_{ip}^{max}$ ;
---

Figure 5:
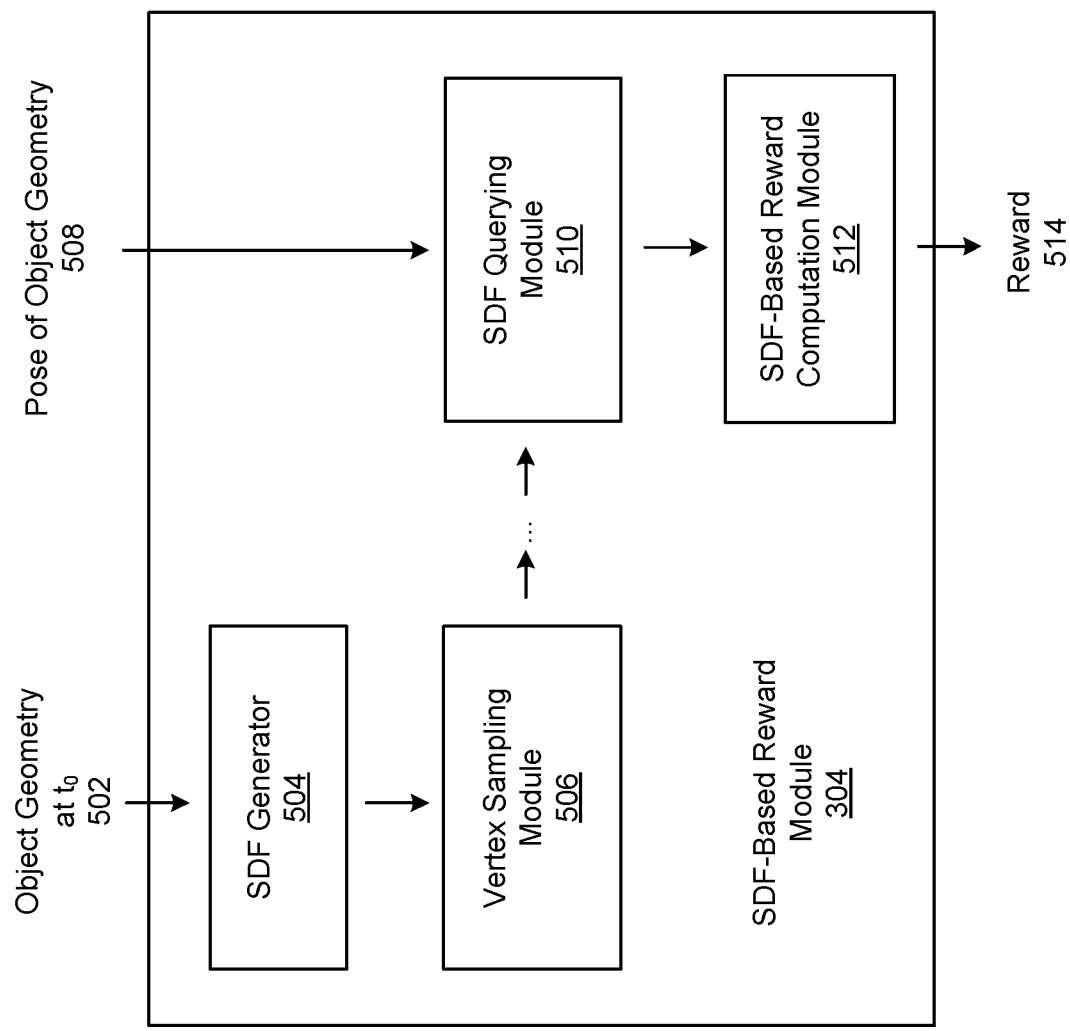
FIG. 5 is a more detailed illustration of the signed distance field (SDF)-based reward module of FIG. 3, according to various embodiments.

FIG. 5 is a more detailed illustration of the SDF-based reward module 304 of FIG. 3, according to various embodiments. As shown, the SDF-based reward module 304 includes an SDF generator 504, a vertex sampling module 506, an SDF querying module 510, and an SDF-based reward computation module 512. In operation, the SDF generator 504 receives object geometry 502 at the beginning of an episode of simulation (time step to), and the SDF generator 504 generates an SDF associated with a target pose of the object. In addition, the vertex sampling module 506 samples points on the object geometry for use in determining distances to the SDF. Then, at a later time step ti, the SDF querying module 510 receives a pose of the object geometry 508 within the simulation. The SDF querying module 510 uses the (1) sampled points from the vertex sampling module 506, and (2) the pose of the object geometry 508 to query the SDF for distances from the points at the time step ti to the SDF. Then, the SDF-based reward computation module 512 computes a reward 514 based on the distance. In some embodiments, the distance can be computed as an average of the distances from the sampled points to the SDF, and the reward can be inversely proportional to the distance.

Figure 6A:
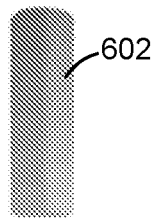
FIGS. 6A-6B illustrate an exemplar computation of distances between an object and an SDF associated with a target pose of the object, according to various embodiments.
Figure 6B:
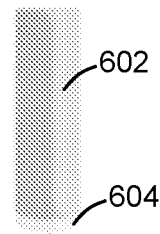

FIGS. 6A-6B illustrate an exemplar computation of distances between an object and an SDF associated with a target pose of the object, according to various embodiments. As described, the SDF-based reward module 304 of the model trainer 116 can compute a reward used to train a machine learning model based on the distance between an object and an SDF associated with a target pose of the object. When the task is inserting a plug into a socket, an SDF 604 can be generated for a target pose of the plug after the plug has been inserted into the socket. As described, the SDF 604 specifies the distances from points in space of the environment to the surfaces of one or more objects within the environment. Alternatively, an SDF can be generated for the socket, rather than the plug.

As shown in FIG. 6A, when the distance between geometry representing a plug 602 that a robot is grasping and the SDF 604 is large, the SDF-based reward module 304 can compute a relatively low reward, which is illustrated by a darker tone of the geometry representing the plug 602. In some embodiments, the distance can be computed as an average of distances between points on the geometry representing the plug 602 and the SDF 604. After the reward is computed based on the distance, the reward can be used during reinforcement learning to update parameters of the machine learning model, such as the policy model 152, that is trained to control a robot.

As shown in FIG. 6B, when the distance between geometry representing a plug 602 that a robot is grasping and the SDF 604 is small, the SDF-based reward module 304 can compute a relatively high reward, which is illustrated by a lighter tone of the geometry representing the plug 602. Similar to the description above in conjunction with FIG. 6A, in some embodiments, the distance can be computed as an average of distances between points on the geometry representing the plug 602 and the SDF 604. After the reward is computed based on the distance, the reward can be used during reinforcement learning to update the parameters of a machine learning model, such as the policy model 152, that is trained to control a robot.

Figure 7:
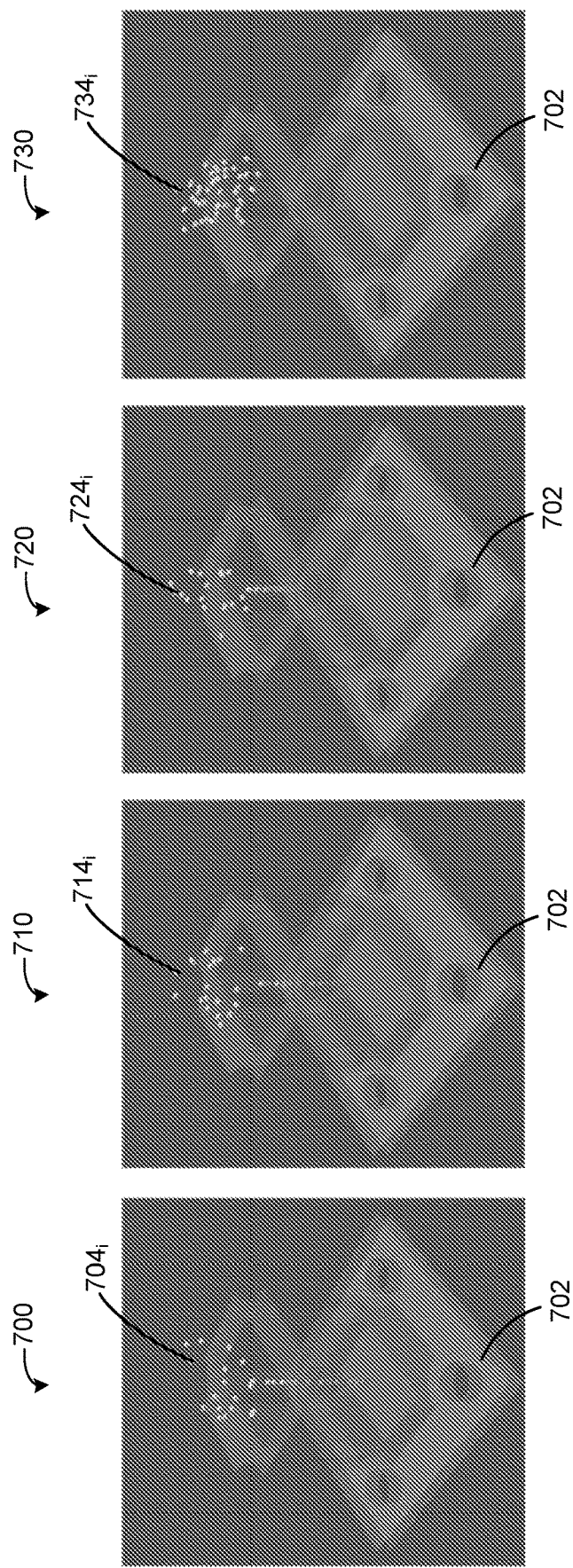
FIG. 7 illustrates exemplar stages of sampling-based curriculum training, according to various embodiments.

FIG. 7 illustrates exemplar stages of sampling-based curriculum training, according to various embodiments. As shown, for the task of inserting a plug (not shown) into a receptacle 702, during an initial stage 700 of the sampling-based curriculum training, the distribution of the initial positions 704$_i$ (referred to herein collectively as initial positions 704 and individually as an initial position 704) of the plug during an episode of training includes the entire of range of difficulties, from initial positions 704 that are inside the receptacle 702 to initial positions 704 that are outside the receptacle 702. After the success rate of the machine learning model in controlling the robot during simulations in the initial stage 700 exceeds a success rate threshold, the sampling-based curriculum training proceeds to a next stage 710, and so forth to stages 720 and 730. During the later stages 710, 720, and 730 of training, the lower bound on the range of difficulties of the task is incrementally increased, and the distribution of the initial positions of the plug 714$_i$, 724$_i$, and 734$_i$, respectively, shift away from the receptacle 702.

Figure 8:
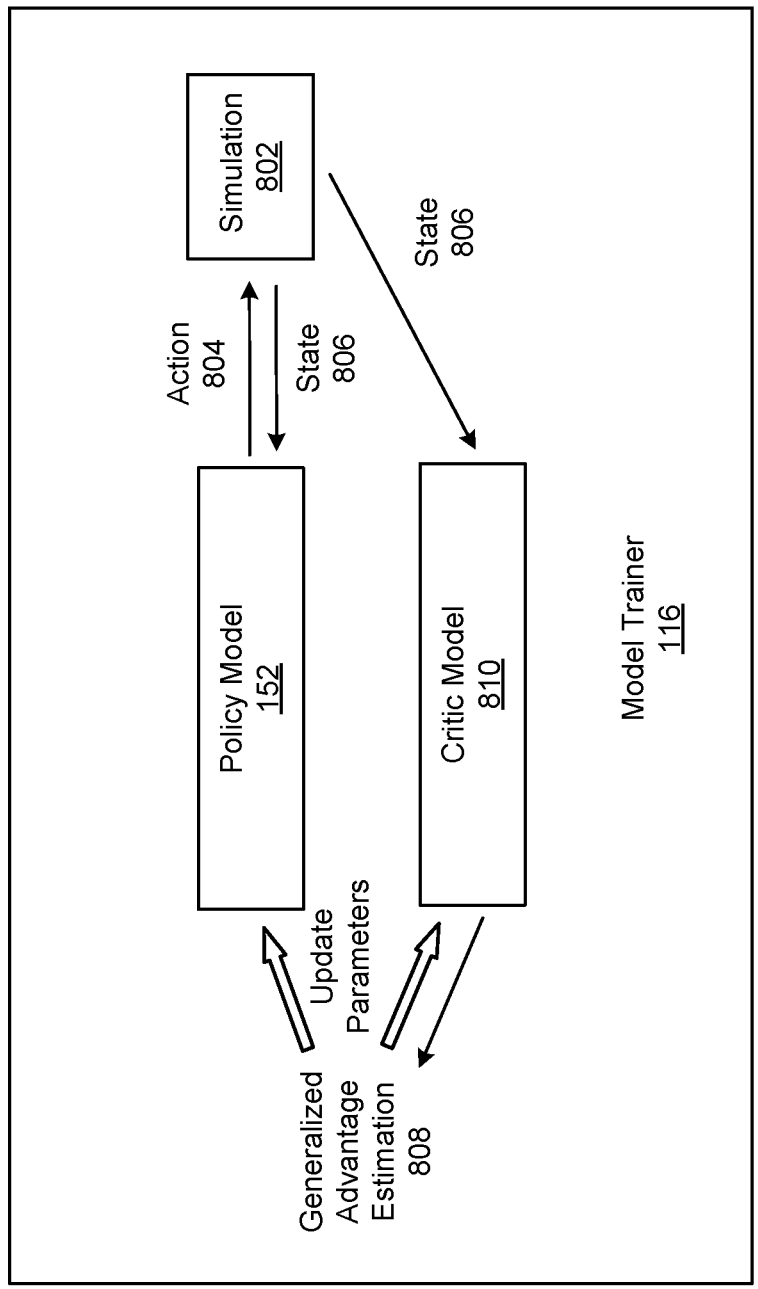
FIG. 8 illustrates how a machine learning model can be trained to control a robot, according to various embodiments.

FIG. 8 illustrates how a machine learning model can be trained to control a robot, according to various embodiments. As shown, in some embodiments, the model trainer 116 trains a machine learning model for controlling a robot, shown as the policy model 152, using reinforcement learning and simulations of the robot.

As described, the training can occur in episodes, each of which includes executing multiple simulations starting from randomized initialized states in parallel. During each simulation, a sequence of actions may be chained together to form a trajectory. Beginning with random trajectories in different simulations, the reinforcement learning trains the policy model 152 to learn to generate actions that can be used to achieve a goal by updating parameters of the policy model 152 based on whether the trajectories lead to states of the robot and/or object(s) with which the robot interacts that are closer or further from the goal.

During each iteration of reinforcement learning, the model trainer 116 updates parameters of the policy model 152 and a critic model 810 that is trained along with the policy model 152. The critic model 810 approximates an estimated value function that is used to criticize actions generated by the policy model 152. Illustratively, after the policy model 152 generates an action 804 that is performed by a robot in the simulation 802, the critic model 810 computes a generalized advantage estimation 808 based on (1) a new state 806 of the robot and/or object(s) that the robot interacts with, and (2) a reward function. The generalized advantage estimation 808 indicates whether the new state 806 is better or worse than expected, and the model trainer 116 updates the parameters of the policy model 152 such that the policy model 152 is more or less likely to generate the action 804 based on whether the new state 806 is better or worse, respectively. In some embodiments, the reward can be computed to account for (1) simulation error, and (2) the distance between an object grasped by a robot and a SDF generated for a target pose of the object, as described above in conjunction with FIGS. 3-7.

Figure 9:
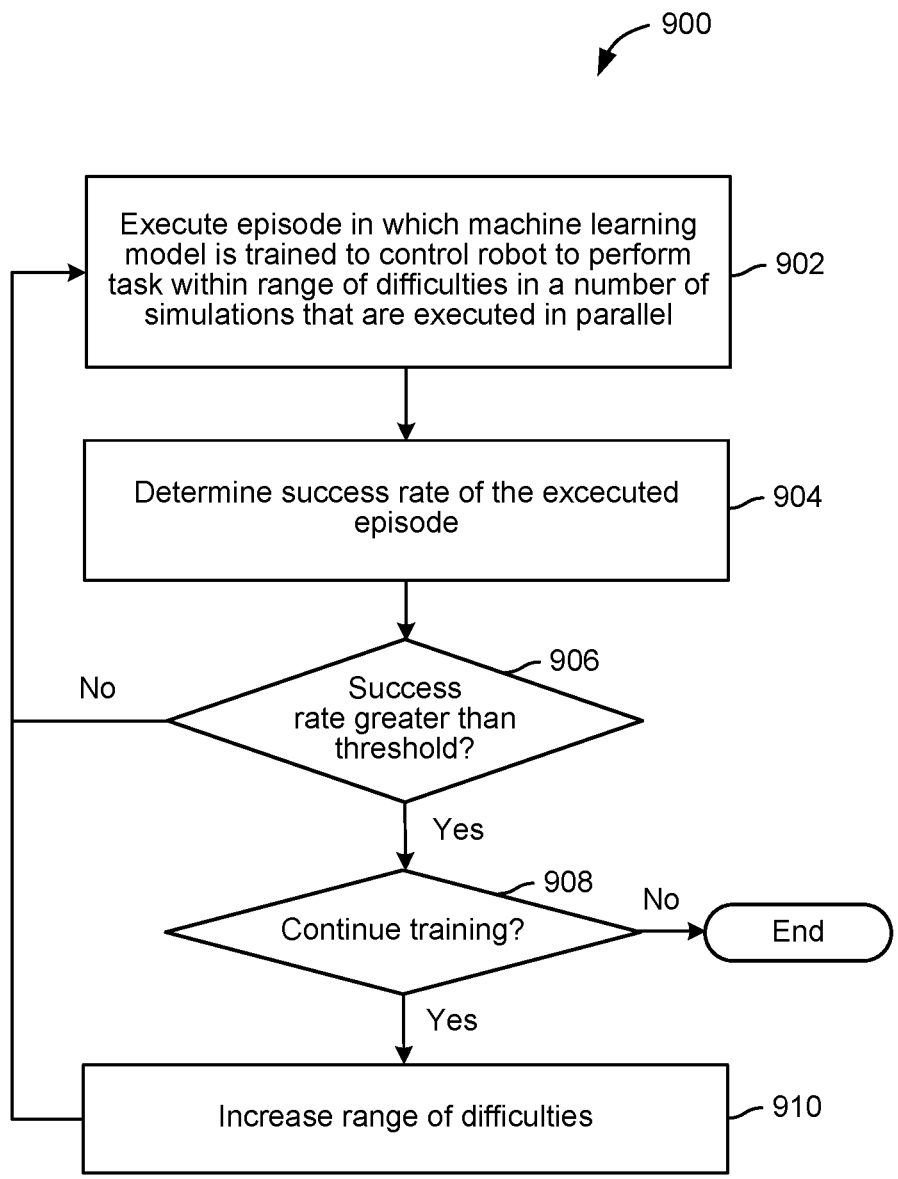
FIG. 9 is a flow diagram of method steps for training a machine learning model to control a robot, according to various embodiments.

FIG. 9 is a flow diagram of method steps for training a machine learning model to control a robot, according to various embodiments. Although the method steps are described in conjunction with the systems of FIGS. 1-5, persons skilled in the art will understand that any system configured to perform the method steps in any order falls within the scope of the present embodiments.

As shown, a method 900 begins at step 902, where the model trainer 116 executes an episode in which a machine learning model (e.g., policy model 152) is trained to control a robot to perform a task within a range of difficulties in a number of simulations that are executed in parallel.

At step 904, the model trainer 116 determines a success rate of the episode executed at step 902. In some embodiments, the success rate is the rate at which the machine learning model successfully controlled the robot to perform the task in the simulations.

At step 906, if the model trainer 116 determines that the success rate is not greater than a success rate threshold, then the method returns to step 802, where the model trainer 116 executes another episode in which the machine learning model is trained to control the robot to perform the task in simulations within the same range of difficulties.

On the other hand, if the model trainer 116 determines that the success rate is greater than the success rate threshold, then the method 900 continues to step 908, where the model trainer 116 determines whether to continue training the machine learning model. If the model trainer 116 determines to stop training the machine learning model, such as if a given number of stages of sampling-based curriculum learning have been performed, then the method 900 ends.

On the other hand, if the model trainer 116 determines to continue training the machine learning model, then the method 900 continues to step 910, where the model trainer 116 increases the range of difficulties used to train the machine learning model. The method 900 then returns to step 902, where the model trainer 116 again executes an episode in which the machine learning model is trained to control the robot to perform the task in simulations within the new range of difficulties.

Figure 10:
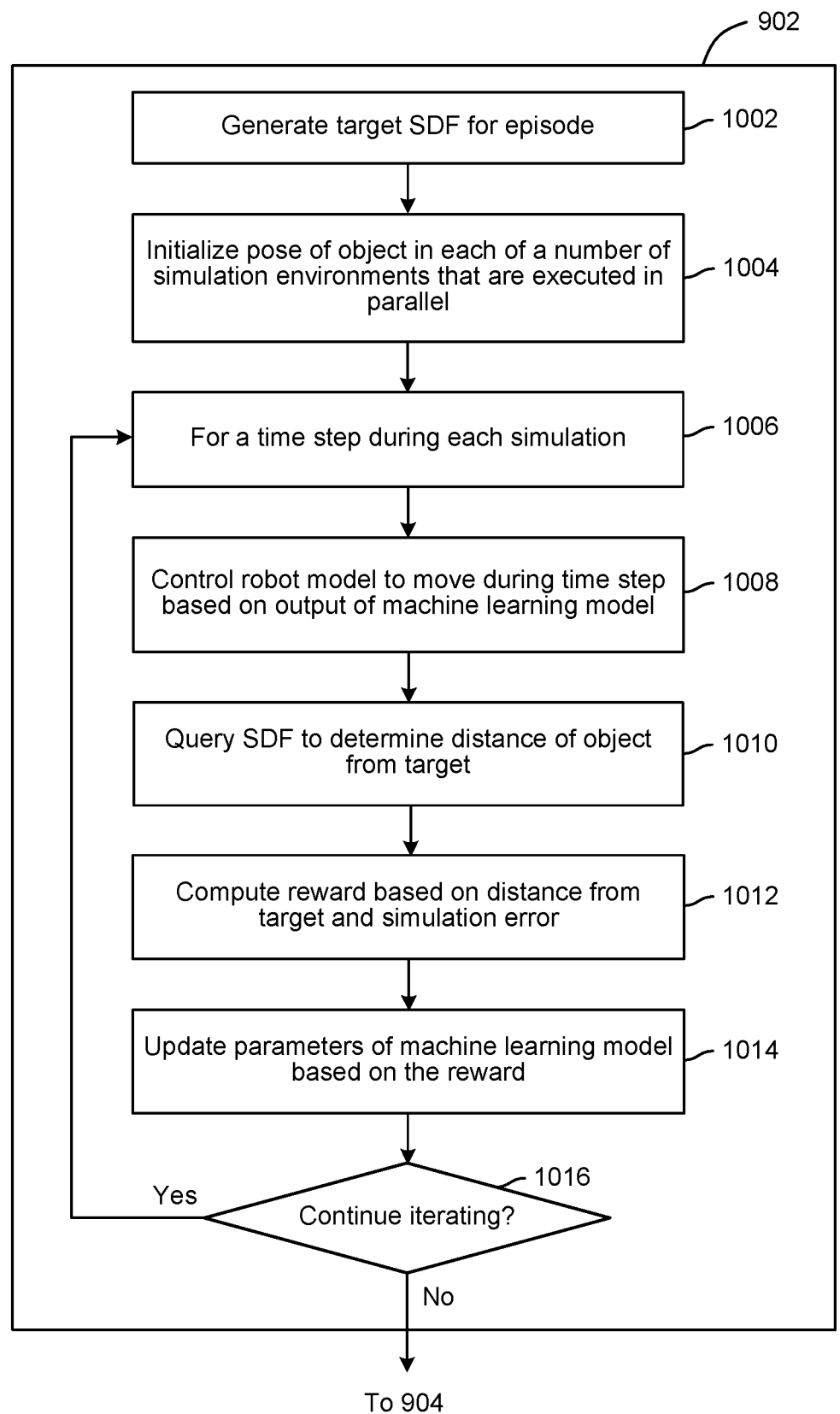
FIG. 10 is a flow diagram of method steps for training a machine learning model during an episode of the method of FIG. 9, according to various embodiments.

FIG. 10 is a flow diagram of method steps for training a machine learning model during an episode at step 902, according to various embodiments. Although the method steps are described in conjunction with the systems of FIGS.

1-5, persons skilled in the art will understand that any system configured to perform the method steps in any order falls within the scope of the present embodiments.

As shown, at step 1002, the model trainer 116 generates a target SDF for the episode. In some embodiments, the target SDF can be generated from geometry of an object in a target pose. In some other embodiments, the target SDF can be generated from the geometry of an object into which another object is to be inserted.

At step 1004, the model trainer 116 initializes a pose of an object in each of a number of simulation environments that are executed in parallel. Returning to the example of inserting a plug into a socket, the object could be the plug, and the model trainer 116 would initialize a pose of the plug at step 904. In some embodiments, the initialized pose can include a random orientation and position in each simulation environment, with the random orientation and position being selected from a current range of difficulties of the simulation, described above in conjunction with FIG. 9.

At step 1006, the model trainer 116 enters a loop in which, for a time step during each simulation, the model trainer 116 controls a robot model to move within each simulation environment based on an output of the machine learning model that is being trained to control the robot at step 1008.

At step 1010, the model trainer 116 queries the SDF to determine a distance that the object is from the target. As described, in some embodiments, the distance can be computed as an average of distances between a number of sampled points on geometry representing the object and the SDF. Further, in some embodiments, a root-mean-square SDF distance can be computed.

At step 1012, the model trainer 116 computes a reward based on the distance determined at step 1010 and a simulation error. In some embodiments, the reward can be computed by weighting the distance by the simulation, as described above in conjunction with FIGS. 3-4

At step 1014, the model trainer 116 updates parameters of the machine learning model based on the reward computed at step 1012.

At step 1016, if the model trainer 116 determines to continue iterating, such as if the target pose for an object being grasped by the robot has not been achieved in the simulation, then the method 900 returns to step 1006, where the model trainer 116 executes another time step of each simulation. On the other hand, if the model trainer 116 determines to stop iterating at step 1016, then the method 900 continues to step 904.

In sum, techniques are disclosed for training a machine learning model to control a robot. In some embodiments, a model trainer trains the machine learning model using a sampling-based curriculum. In the sampling-based curriculum, the model trainer first trains the machine learning model to perform a robotic task within an entire range of difficulties of the task. When the success rate of the machine learning model in controlling the robot to perform the task exceeds a threshold success rate, the model trainer increases a lower bound of the range of difficulties of the task that the machine learning model is trained with, and so forth. In some embodiments, the model trainer also computes an error during one or more physical simulations that are used to generate training data for training the machine learning model. Then, the model trainer computes a reward that penalizes the error and/or an observation based on the error, updates parameters of the machine learning model during training based on the error. In addition, in some embodiments, the reward can also be computed based on a distance between an object that the robot grasps during a simulation and a SDF associated with a target pose that the object should achieve. Once trained, the machine learning model can be deployed to control a physical robot to perform the task in a real-world environment.

At least one technical advantage of the disclosed techniques relative to the prior art is that the disclosed techniques account for errors, such as interpenetrations between a robot and one or more objects, that are produced by a simulator when a machine learning model is trained to perform a task using training data that is generated by simulating the robot performing the task. After being trained according to the disclosed techniques, the machine learning model can correctly control a physical robot to perform the task in a real-world environment. Further, the disclosed techniques enable a machine learning model to be trained using sampling-based curriculum training and a signed distance field (SDF)-based reward, which can allow the machine learning model to more successfully learn how to control a robot relative to what can be achieved using prior art training approaches. These technical advantages represent one or more technological improvements over prior art approaches.

1. In some embodiments, a computer-implemented method for training a machine learning model to control a robot comprises causing a model of the robot to move within a simulation based on one or more outputs of the machine learning model, computing an error within the simulation, computing at least one of a reward or an observation based on the error, and updating one or more parameters of the machine learning model based on the at least one of a reward or an observation.

2. The computer-implemented method of clause 1, further comprising computing a distance between one or more points on a model of an object being grasped by the model of the robot during the simulation and a signed distance field (SDF) associated with a target pose of the model of the object, wherein the at least one of a reward or an observation is further computed based on the distance.

3. The computer-implemented method of clauses 1 or 2, wherein the distance comprises a root-mean-square SDF distance.

4. The computer-implemented method of any of clauses 1-3, further comprising performing one or more operations to determine a success rate of the machine learning model when controlling the model of the robot to perform a task involving an object in one or more simulations, and responsive to determining that the success rate is greater than a predefined threshold, increasing a starting distance between the model of the robot and a model of the object in one or more subsequent simulations.

5. The computer-implemented method of any of clauses 1-4, wherein computing the reward comprises, responsive to determining that the error is greater than an error threshold computing a weight value based on the error, and computing the reward based on the weight value.

6. The computer-implemented method of any of clauses 1-5, wherein the error is associated with at least one of an interpenetration between two objects during the simulation, a solver residual, a deviation from a ground truth, a deviation of the simulation from a slower simulation, a deviation from a reference value, or a deviation from an analytical solution.

7. The computer-implemented method of any of clauses 1-6, wherein the steps of causing the model of the robot to move within the simulation, computing the error, computing the at least of one of the reward or the observation, and updating the one or more parameters are repeated for each time step included in a plurality of time steps.

8. The computer-implemented method of any of clauses 1-7, further comprising performing one or more operations to control the robot based on one or more additional outputs of the machine learning model.

9. The computer-implemented method of any of clauses 1-8, further comprising generating one or more control signals based on one or more additional outputs of the machine learning model, and causing the robot to move within a real-world environment based on the one or more control signals.

10. The computer-implemented method of any of clauses 1-9, further comprising processing one or more sensor signals using the machine learning model to generate the one or more additional outputs.

11. In some embodiments, one or more non-transitory computer-readable media store instructions that, when executed by at least one processor, cause the at least one processor to perform the steps of causing a model of the robot to move within a simulation based on one or more outputs of the machine learning model, computing an error within the simulation, computing at least one of a reward or an observation based on the error, and updating one or more parameters of the machine learning model based on the at least one of a reward or an observation.

12. The one or more non-transitory computer-readable media of clause 11, wherein the instructions, when executed by the at least one processor, further cause the at least one processor to perform the step of computing a distance between one or more points on a model of an object being grasped by the model of the robot during the simulation and a signed distance field (SDF) associated with a target pose of the model of the object, wherein the at least one of a reward or an observation is further computed based on the distance.

13. The one or more non-transitory computer-readable media of clauses 11 or 12, wherein the distance comprises a root-mean-square SDF distance.

14. The one or more non-transitory computer-readable media of any of clauses 11-13, wherein the instructions, when executed by the at least one processor, further cause the at least one processor to perform the steps of performing one or more operations to determine a success rate of the machine learning model when controlling the model of the robot to perform a task involving an object in one or more simulations, and responsive to determining that the success rate is greater than a predefined threshold, increasing a starting distance between the model of the robot and a model of the object in one or more subsequent simulations.

15. The one or more non-transitory computer-readable media of any of clauses 11-14, wherein the instructions, when executed by the at least one processor, further cause the at least one processor to perform the steps of, responsive to determining that the error is greater than an error threshold computing a weight value based on the error, and computing the reward based on the weight value.

16. The one or more non-transitory computer-readable media of any of clauses 11-15, wherein computing the error comprises performing one or more operations to determine one or more intermediate errors between one or more points on the model of the robot and one or more points on a model of the object within the simulation, and computing the error based on the one or more intermediate errors.

17. The one or more non-transitory computer-readable media of any of clauses 11-16, wherein computing the error based on the one or more intermediate errors comprises determining a maximum of the one or more intermediate errors.

18. The one or more non-transitory computer-readable media of any of clauses 11-17, wherein the instructions, when executed by the at least one processor, further cause the at least one processor to perform the step of performing one or more operations to control the robot based on one or more additional outputs of the machine learning model.

19. The one or more non-transitory computer-readable media of any of clauses 11-18, wherein the one or more objects includes a first object, and the simulation includes at least one of picking the first object, placing the first object, or inserting the first object into a second object.

20. In some embodiments, a system comprises one or more memories storing instructions, and one or more processors that are coupled to the one or more memories and, when executing the instructions, are configured to cause a model of a robot to move within a simulation based on one or more outputs of the machine learning model, perform one or more operations to determine an error within the simulation, compute at least one of a reward or an observation based on the error, and update one or more parameters of the machine learning model based on the at least one of a reward or an observation.

21. The system of clause 20, further comprising the robot, wherein the one or more processors, when executing the instructions, are further configured to process one or more sensor signals associated with the robot using the machine learning model to generate one or more additional outputs, and perform one or more operations to control the robot based on the one or more additional outputs.

22. The system of clauses 20 or 21, wherein the robot is controlled to perform a task that comprises at least one of picking an object, placing an object, or inserting an object into another object.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for training a machine learning model to control a robot, the method comprising:
   causing a model of the robot to move within a simulation based on one or more outputs of the machine learning model;
   computing an error within the simulation based on simulated sensor data of a physically articulated manipulator of the robot and movement of the model of the robot;
   computing at least one of a reward or an observation based on the error; and
   training the machine learning model by updating one or more parameters of the machine learning model based on the at least one of the reward or the observation.

2. The computer-implemented method of claim 1, further comprising computing a distance between one or more points on a model of an object being grasped by the model of the robot during the simulation and a signed distance field (SDF) associated with a target pose of the model of the object, wherein the at least one of the reward or the observation is further computed based on the distance.

3. The computer-implemented method of claim 2, wherein the distance comprises a root-mean-square SDF distance.

4. The computer-implemented method of claim 1, further comprising:
   performing one or more operations to determine a success rate of the machine learning model when controlling the model of the robot to perform a task involving an object in one or more simulations; and
   responsive to determining that the success rate is greater than a predefined threshold, increasing a starting distance between the model of the robot and a model of the object in one or more subsequent simulations.

5. The computer-implemented method of claim 1, wherein computing the reward comprises, responsive to determining that the error is greater than an error threshold:
   computing a weight value based on the error, and
   computing the reward based on the weight value.

6. The computer-implemented method of claim 1, wherein the error is associated with at least one of an interpenetration between two objects during the simulation, a solver residual, a deviation from a ground truth, a deviation of the simulation from a slower simulation, a deviation from a reference value, or a deviation from an analytical solution.

7. The computer-implemented method of claim 1, wherein the steps of causing the model of the robot to move within the simulation, computing the error, computing the at least of one of the reward or the observation, and updating the one or more parameters are repeated for each time step included in a plurality of time steps.

8. The computer-implemented method of claim 1, further comprising performing one or more operations to control the robot based on one or more additional outputs of the machine learning model.

9. The computer-implemented method of claim 1, further comprising:
   generating one or more control signals based on one or more additional outputs of the machine learning model; and
   causing the robot to move within a real-world environment based on the one or more control signals.

10. The computer-implemented method of claim 9, further comprising processing one or more sensor signals using the machine learning model to generate the one or more additional outputs.

11. One or more non-transitory computer-readable media storing instructions that, when executed by at least one processor, cause the at least one processor to perform the steps of:
   causing a model of a robot to move within a simulation based on one or more outputs of a machine learning model;
   computing an error within the simulation based on simulated sensor data of a physically articulated manipulator of the robot and movement of the model of the robot;
   computing at least one of a reward or an observation based on the error; and training the machine learning model by updating one or more parameters of the machine learning model based on the at least one of the reward or the observation.

12. The one or more non-transitory computer-readable media of claim 11, wherein the instructions, when executed by the at least one processor, further cause the at least one processor to perform the step of computing a distance between one or more points on a model of an object being grasped by the model of the robot during the simulation and a signed distance field (SDF) associated with a target pose of the model of the object, wherein the at least one of the reward or the observation is further computed based on the distance.

13. The one or more non-transitory computer-readable media of claim 12, wherein the distance comprises a root-mean-square SDF distance.

14. The one or more non-transitory computer-readable media of claim 11, wherein the instructions, when executed by the at least one processor, further cause the at least one processor to perform the steps of:
performing one or more operations to determine a success rate of the machine learning model when controlling the model of the robot to perform a task involving an object in one or more simulations; and
responsive to determining that the success rate is greater than a predefined threshold, increasing a starting distance between the model of the robot and a model of the object in one or more subsequent simulations.

15. The one or more non-transitory computer-readable media of claim 11, wherein the instructions, when executed by the at least one processor, further cause the at least one processor to perform the steps of, responsive to determining that the error is greater than an error threshold:
computing a weight value based on the error, and
computing the reward based on the weight value.

16. The one or more non-transitory computer-readable media of claim 11, wherein computing the error comprises:
performing one or more operations to determine one or more intermediate errors between one or more points on the model of the robot and one or more points on a model of an object within the simulation; and
computing the error based on the one or more intermediate errors.

17. The one or more non-transitory computer-readable media of claim 16, wherein computing the error based on the one or more intermediate errors comprises determining a maximum of the one or more intermediate errors.

18. The one or more non-transitory computer-readable media of claim 11, wherein the instructions, when executed by the at least one processor, further cause the at least one processor to perform the step of performing one or more operations to control the robot based on one or more additional outputs of the machine learning model.

19. The one or more non-transitory computer-readable media of claim 11, wherein the simulation includes at least one of picking a first object, placing the first object, or inserting the first object into a second object.

20. A system, comprising:
one or more memories storing instructions; and
one or more processors that are coupled to the one or more memories and, when executing the instructions, are configured to:
cause a model of a robot to move within a simulation based on one or more outputs of a machine learning model,
perform one or more operations to determine an error within the simulation based on simulated sensor data of a physically articulated manipulator of the robot and movement of the model of the robot,
compute at least one of a reward or an observation based on the error, and
train the machine learning model by updating one or more parameters of the machine learning model based on the at least one of the reward or the observation.

21. The system of claim 20, further comprising the robot, wherein the one or more processors, when executing the instructions, are further configured to:
process one or more sensor signals associated with the robot using the machine learning model to generate one or more additional outputs; and
perform one or more operations to control the robot based on the one or more additional outputs.

22. The system of claim 21, wherein the robot is controlled to perform a task that comprises at least one of picking an object, placing an object, or inserting an object into another object.

* * * * *